United States Patent [19]

McCreery

[11] Patent Number: 4,463,512

[45] Date of Patent: Aug. 7, 1984

[54] DIRECT CONNECTED SPINNING ROD HANDLE

[76] Inventor: William G. McCreery, 122 Caldwell Dr., Hendersonville, Tenn. 37075

[21] Appl. No.: 404,535

[22] Filed: Aug. 2, 1982

[51] Int. Cl.³ .............................................. A01K 87/06
[52] U.S. Cl. ......................................... 43/22; 43/23
[58] Field of Search .................... 43/22, 23, 18.1, 18.5

[56] References Cited

U.S. PATENT DOCUMENTS

| 1,995,242 | 3/1935 | Clarke | 43/22 |
| 2,630,647 | 3/1953 | Phillipson | 43/22 |
| 2,826,852 | 3/1958 | Wardrip | 43/22 |

FOREIGN PATENT DOCUMENTS

| 1038421 | 5/1953 | France | 43/22 |
| 66658 | 9/1913 | Switzerland | 43/22 |

Primary Examiner—Gene P. Crosby
Attorney, Agent, or Firm—Harrington A. Lackey

[57] ABSTRACT

A fishing rod handle assembly including an elongated handle member having an elongated groove formed in the external surface of the handle member for receiving an elongated fishing rod or rod member so that the rod member surface projects outwardly sufficiently that the hand of the fisherman holding the handle member will be in contact with the rod member. A clamp member is secured about the handle member for securing the rod member co-extensively within the groove, and also, preferably, securing a reel seat of a fishing reel directly and contiguously against the exposed surface of the rod member.

5 Claims, 3 Drawing Figures

DIRECT CONNECTED SPINNING ROD HANDLE

BACKGROUND OF THE INVENTION

This invention relates to fishing rods, and more particularly to a fishing rod handle assembly.

In conventional fishing rod handle assemblies in which the handle is connected to the rod member, the rod member is completely encased within the handle. Thus, when the hand of the fisherman grasps the handle, no part of the hand is in contact with the rod member, but only in contact with the handle. Examples of such rod members fully encased in the fishing rod handle are disclosed in the following patents:

U.S. Pat. No. 2,630,647, Phillipson, Mar. 10, 1953;
U.S. Pat. No. 3,826,852, Wardip, Mar. 18, 1958;
French Pat. No. 1,038,421, Schweyckart, May 6, 1953.

SUMMARY OF THE INVENTION

It is therefore an object of this invention to provide an improved and simplified fishing rod handle, more specifically a spinning rod handle, in which the rod member may be secured directly to the handle in such a manner that a portion of the rod member is exposed to the feel or engagement of the hand of the fisherman when holding the fishing rod handle.

A further object of the invention is to provide a fishing rod handle assembly including a very simple connection of the rod member to the handle.

Another object of this invention is to provide a fishing rod handle of much lighter weight than conventional handles.

Another object of this invention is to provide a fishing rod handle assembly including a handle and a rod member, in which the rod member is easily interchangeable with other fishing rod members.

An important object of this invention is to provide a fishing rod handle assembly which improves the sensitivity of the user or fisherman to the presence of striking fish.

The fishing rod handle assembly made in accordance with this invention includes an elongated handle or handle member, having an elongated groove formed in the external surface of the handle member and an elongated rod member received longitudinally within the groove. The groove is of such dimension that a portion of the rod member is exposed or projects beyond the periphery of the external surface of the handle member to permit the hand of the user or fisherman grasping the handle member to directly engage, or be in contact with, the surface of the rod member. The rod member is held in this exposed position within the groove by means of a clamp member secured about the handle member, and also preferably holding the reel seat of a spinning reel in direct contact or engagement with the exposed portion of the rod member.

DESCRIPTION OF THE PREFERRED EMBODIMENT

Figure 1:
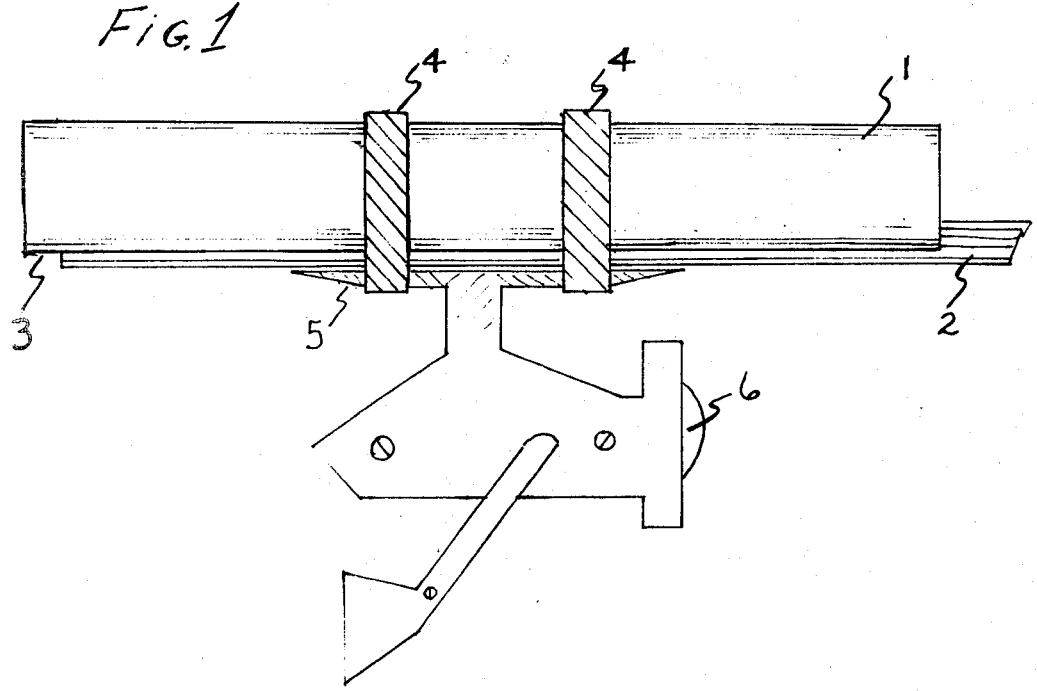
FIG. 1 is a side elevational view of the fishing rod handle assembly, made in accordance with this invention, with the rod member shown fragmentarily and a reel seat secured to the rod member.
Figure 2:
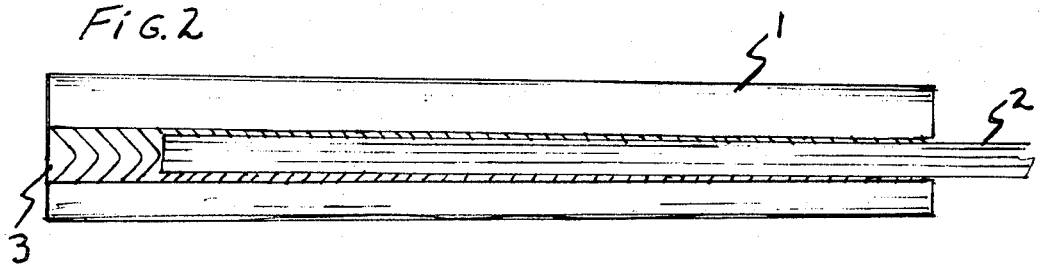
FIG. 2 is a bottom plan view of the assembly disclosed in FIG. 1, with the clamp member and reel seat removed, and with the rod member slightly shifted forward to reveal the groove.

Referring now to the drawings in more detail, the fishing rod assembly disclosed in FIG. 1, made in accordance with this invention, includes an elongated handle or handle member 1 made of solid or tubular material, such as metal, plastic, re-inforced plastic, or wood.

Figure 3:
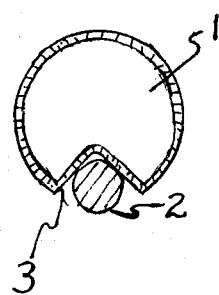
FIG. 3 is a rear end view of the assembly disclosed in FIG. 2.

Formed in the external surface of the handle 1 is an elongated slot or groove 3 adapted to receive the conventional elongated fishing rod 2, co-extensively therewith. The depth and width of the groove 3 can be varied to accept or receive an elongated fishing rod, such as the fishing rod 2 having a circular cross-section, so that a portion of ths fishing rod 2 is exposed to direct contact by the hand of the user or fisherman holding the handle 1. As best disclosed in FIG. 3, the outer periphery of the fishing rod 2 preferably projects beyond the periphery or external surface of the handle 1. Since the handle 1 is shown in circular cross-section in FIG. 3, then the exposed circular position of the rod 2 projects slightly beyond the circular periphery of the handle 1, or in other words extends a distance slightly greater than the radius of the circular handle 1.

The rod 2 is held in its operative position, longitudinally seated within the groove 3, by securing means, such as the annular clamp rings 4 extending around the outside of the handle 1 and the rod 2. As disclosed in FIG. 1, annular clamp rings 4 also extend around the reel seat 5 of a fishing reel 6 to hold the reel seat 5 in direct contact with the exposed periphery of the fishing rod 2, as disclosed in FIG. 1.

Other types of securing means for securing the elongated rod member 2 within the groove 3 may be utilized, instead of the annular clamp rings 4, such as a permanent adhesion means, tapered rings for temporary mounting, banding tapes strapped around the handle 1, rod 2 and reel seat 5, and other similar securing means.

By securing the elongated rod 2 in the groove 3 so that a portion of the rod 2 is exposed externally of the handle 1, the user's or fisherman's hand engaging the handle 1 across the groove 3 will be in direct contact with the rod 2 itself to improve the user's sensitivity to the presence of fish striking a line carried by the rod 2.

The handle 1 and securing means 4 are adapted to be readily attached to different fishing rods 2, including rods of different diameters.

In a preferred form of the invention, the handle 1 is a cylindrical handle member, approximately 6–12 inches long, formed of wood, metal, or synthetic material, having an outside diameter of ¾–1½ inches. The slot or groove 3 extends along the external surface of the length of the handle member and has a width and depth less than the diameter of the handle member 1.

I claim:

1. A fishing rod handle in combination with a rod member, comprising, said fishing rod handle having an external surface, a groove formed in said external surface of said handle and extending longitudinally for at least a partial distance along said external surface, said rod member being adapted for placement into said groove, and means for securing said rod member to said fishing rod handle, wherein the user's hand will be in contact with the rod member while holding said handle.

2. The invention according to claim 1 in which said rod member has an external surface, a portion of which projects outwardly from the external surface of said fishing rod handle.

3. The invention according to claim 2 in which the external surface of said fishing rod handle has a curved cross-section and the external surface of said rod member has a curved cross-section of lesser radius than the curved cross-section of said handle, the portion of said rod member projecting outwardly beyond said external surface, projecting outwardly beyond the curved plane of the external surface of said fishing rod handle.

4. The invention according to claim 3 in which said fishing rod handle comprises means for connecting the seat of a reel directly to said rod member.

5. The invention according to claim 4 in which said means securing said rod member to said fishing rod handle comprises means securing the seat of a reel contiguously against the portion of said rod member projecting outwardly from the external surface of said fishing rod handle.

* * * * *